US006411291B2

United States Patent
Shiiyama

(10) Patent No.: US 6,411,291 B2
(45) Date of Patent: *Jun. 25, 2002

(54) IMAGE PROCESSING APPRATUS AND METHOD OF CONTROLLING SAME

(75) Inventor: Hirotaka Shiiyama, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/095,545

(22) Filed: Jun. 11, 1998

(30) Foreign Application Priority Data

Jun. 19, 1997 (JP) .............................. 9-163033

(51) Int. Cl.[7] .............................................. G06T 15/00
(52) U.S. Cl. ....................................................... 345/419
(58) Field of Search ................................ 345/440, 419, 345/418, 441, 788

(56) References Cited

U.S. PATENT DOCUMENTS

| 5,708,767 A | * | 1/1998 | Yeo et al. | 395/140 |
| 5,764,239 A | * | 6/1998 | Misue et al. | 345/440 |
| 5,801,687 A | * | 9/1998 | Peterson et al. | 345/440 |
| 5,896,139 A | * | 4/1999 | Strauss | 345/440 |

* cited by examiner

Primary Examiner—Phu K. Nguyen
(74) Attorney, Agent, or Firm—Fitzpatrick, Cella, Harper & Scinto

(57) ABSTRACT

Image data and coordinate of sought image data contained in this image data are entered from an image input unit. Next, the sought image data is extracted by a sought-object extraction unit based upon the coordinates of the entered sought image data. An image feature of the extracted sought image data is then calculated by an image-feature extraction unit. The calculated image feature and the entered image data are mapped in an image memory unit and managed.

13 Claims, 14 Drawing Sheets

IMAGE PROCESSING APPRATUS AND METHOD OF CONTROLLING SAME

BACKGROUND OF THE INVENTION

This invention relates to an image processing apparatus or managing image data to a method of controlling this apparatus.

Using a photographically captured image as a retrieval condition when retrieving image data managed by an image processing apparatus does not assure good retrieval precision because it is difficult to realize accurate recognition of the captured image.

The general practice, therefore, is to append explanatory text and a keyword indicative of image data when the image data is managed and subsequently retrieve the image data using the explanatory text and keyword that were appended to the image data.

The following method has been proposed as a method of retrieving image data to which explanatory text and a keyword have not been appended: First, the image features of the overall image data are extracted and the extracted image features are managed by being mapped to the image data. Then the image feature of image data entered as a retrieval condition is extracted and this extracted image feature is compared with the image features of the managed image data to thereby retrieve the desired image data.

With an image processing apparatus that manages image data by appending explanatory text and keywords to image data, the task of appending the explanatory text and keywords to the image data places a considerable burden upon user, especially when the image data managed is large in quantity.

In the case of the image processing apparatus that manages image data by mapping image data to the image features thereof, image data is merely retrieved based upon the image features of the overall image data, and image data inclusive of image data sought by the user that is contained in the overall image data cannot be retrieved with a high degree of precision. Further, in view of the fact that it may generally be surmised that image data entered by the user as a retrieval condition is decided based upon the sought image data, the fact that the sought image data can be retrieved as a retrieval condition is of great significance.

SUMMARY OF THE INVENTION

Accordingly, an object of the present invention is to provide an image processing apparatus and a method of controlling the same whereby the burden placed upon the user for the purpose of managing image data is alleviated and image data in accordance with user preference can be retrieved from the managed image data.

According to the present invention, the foregoing object is attained by providing an image processing apparatus for managing image data, comprising input means for inputting image data and coordinates of sought image data contained in this image data, calculating means for calculating an image feature of the sought image data based upon the coordinates of the sought image data input by the input means, and management means for performing management by mapping the image feature calculated by the calculating means and the input image data.

Further, according to the present invention, the foregoing object is attained by providing a method of controlling an image processing apparatus for managing image data, comprising an input step of inputting image data and coordinates of sought image data contained in this image data, a calculating step of calculating an image feature of the sought image data based upon the coordinates of the sought image data input at the input step, and a management step of performing management in a memory by mapping the image feature calculated at the calculating step and the input image data.

Further, according to the present invention, the foregoing object is attained by providing a computer readable memory storing program codes for controlling an image processing apparatus for managing image data, comprising program code of an input step of inputting image data and coordinates of sought image data contained in this image data, program code of a calculating step of calculating an image feature of the sought image data based upon the coordinates of the sought image data input at the input step, and program code of a management step of performing management in a memory by mapping the image feature calculated at the calculating step and the input image data.

In accordance with the present invention described above, it is possible to provide an image processing apparatus and a method of controlling the same whereby the burden placed upon the user for the purpose of managing image data is alleviated and image data in accordance with user preference can be retrieved from the managed image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

A preferred embodiment of the present invention will now be described in detail with reference to the drawings.

Figure 1:
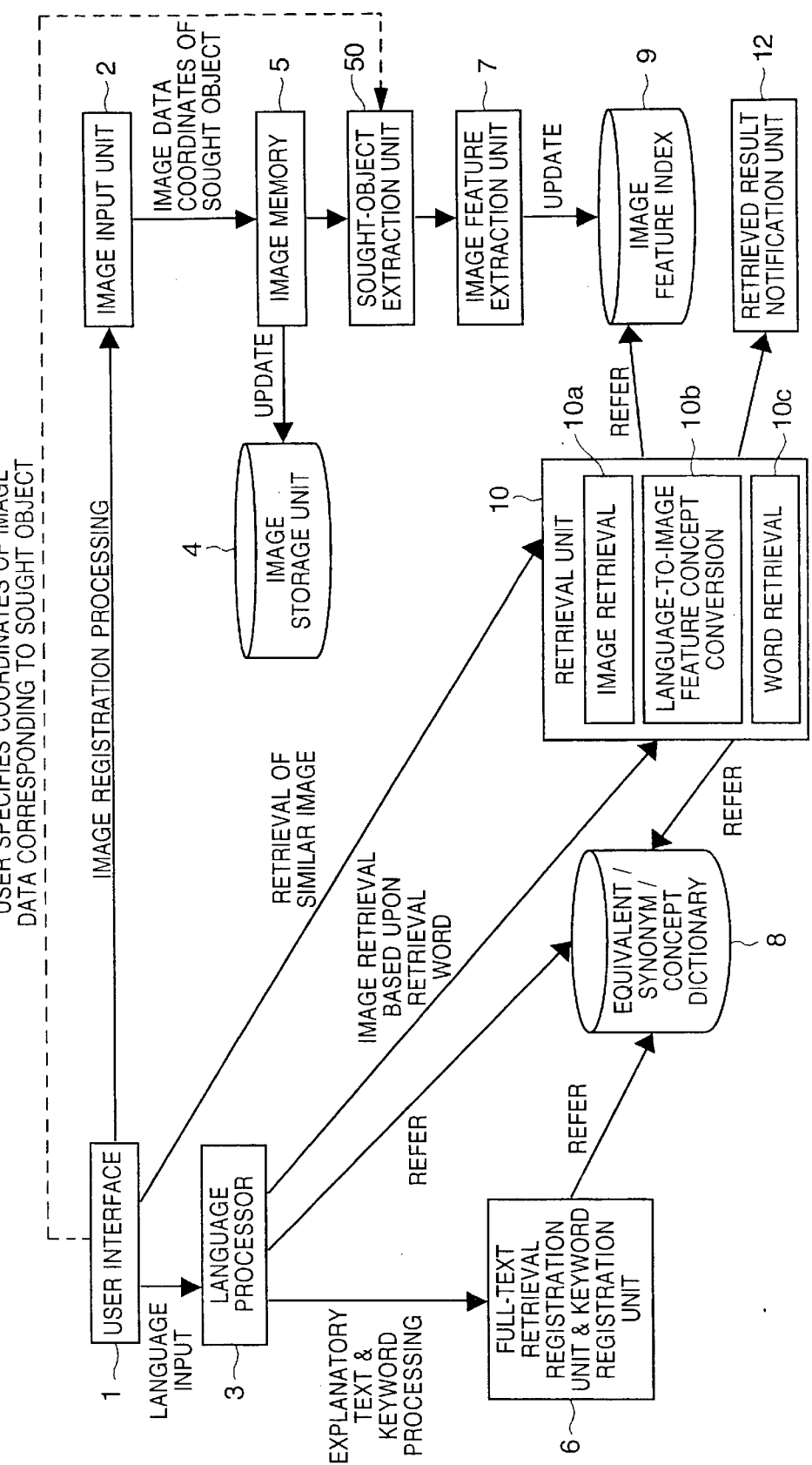
FIG. 1 is a block diagram illustrating the construction of an image processing apparatus according to an embodiment of the present invention.

FIG. 1 is a block diagram illustrating the construction of an image processing apparatus according to an embodiment of the present invention.

The apparatus of FIG. 1 includes a user interface 1 comprising a keyboard and mouse, an image input unit 2 for inputting image data, a language processor 3, and an image storage unit 4 for accumulating image data stored temporarily in an image memory 5. According to this embodiment, the image input unit 2 is an image photography input unit having a line-of-sight sensor incorporated in a finder or an image photography input unit having a control panel by which an image displayed on a built-in or externally attached display unit can be subjected to manipulation such as processing and editing. In accordance with a command from the user interface 1, the image input unit 2 enters image data based upon a captured image as well as the coordinates of image data (referred to as "sought image data" below) corresponding to an object of interest contained in the first-mentioned image data.

For example, consider the image photography input unit having the line-of-sight sensor incorporated in the finder. The coordinates of sought image data in a case where this input unit is employed are acquired from coordinate information represented by the image data coordinate system of the user's line of sight, which data is obtained from the line-of-sight sensor.

In the case of the image photography input unit having the control panel by which an image displayed on a built-in or externally attached display unit can be subjected to manipulation such as processing and editing, the coordinates of sought image data are obtained by designating the sought object from the image displayed on the display unit and acquiring the coordinates from coordinate information on the display unit, the coordinate information representing the sought object that has been designated.

Further, consider an image photography input unit not having the function of the above-described image photography input unit. The coordinates of the sought image data in a case where such an input unit is employed are acquired from coordinates for which there is a statistically high probability of a prior existence of the sought object or from coordinates of a sought object for which information such as lightness, hue and saturation is decided from a psychological standpoint. A method of acquiring coordinates of sought image data from a psychological standpoint is to adopt the position of the center of the captured image as the coordinates of sought image data or to calculate prominence through a calculation which weights the height of saturation and the height of luminance in input image data and adopt image data having a high degree of prominence as the coordinates of the sought image data.

The image memory 5 temporarily stores the image data and the coordinates of the sought image data entered from the image input unit 2. A sought-object extraction unit 50 extracts the sought image data from the entered image data based upon the entered coordinates of the sought image data. An image feature extraction unit 7 extracts an image feature for retrieving image data that resembles the sought image data extracted by the sought-object extraction unit 50.

Extraction of the sought image data and of the image feature thereof is carried out through the following procedure: First, while taking the color and edge of image data into consideration, a particular area is increased in size from the coordinates of the sought image data toward the periphery while ranges over which identical image data can be recognized are obtained. Further, in concurrence with this growth of the area, an image feature on the boundary of each range is extracted. Each image feature obtained until the area eventually grows to the shape, position and size of the image data is extracted as the image feature of the sought image data.

An image feature index 9 registers the image feature of image data extracted by the image feature extraction unit 7 by mapping this feature to the image data.

The language processor 3 outputs a retrieval word, which has been entered from the user interface 1, to an image retrieval unit 10.

Numeral 6 denotes a full-text retrieval registration unit & keyword registration unit for registering a word, which is entered from the language processor 3, by mapping the word to the entered image data. An equivalent/synonym/concept dictionary 8 is a dictionary for managing equivalents and synonyms according to each concept corresponding thereto. A word managed by the equivalent/synonym/concept dictionary 8 has an appended image feature weighting that indicates its own effectiveness with respect to a retrieval word. The details of the equivalent/synonym/concept dictionary 8 will be described later.

The retrieval unit 10 has an image retrieval section 10a, a language-to-image feature concept converter 10b and a word retrieval section 10c. The word retrieval section 10c retrieves a word pertaining to a retrieval word entered from the language processor 3. The language-to-image feature concept converter 10b obtains the image feature weighting corresponding to a retrieval word by referring to the equivalent/synonym/concept dictionary 8 and calculates an image feature for retrieving the image data. On the basis of the image feature calculated by the language-to-image feature concept converter 10b, the image retrieval section 10a refers to the image feature index 9 to retrieve the image data.

A retrieved result notification unit 12 displays image data obtained from the image retrieval unit 10 as the results of retrieval. Further, in regard to an entered retrieval word, the retrieved result notification unit 12 displays a dialog screen for obtaining information, to the user, that useful in performing retrieval.

An example of the detailed construction of the equivalent/synonym/concept dictionary 8 according to this embodiment will now be described with reference to FIG. 2.

Figure 2:
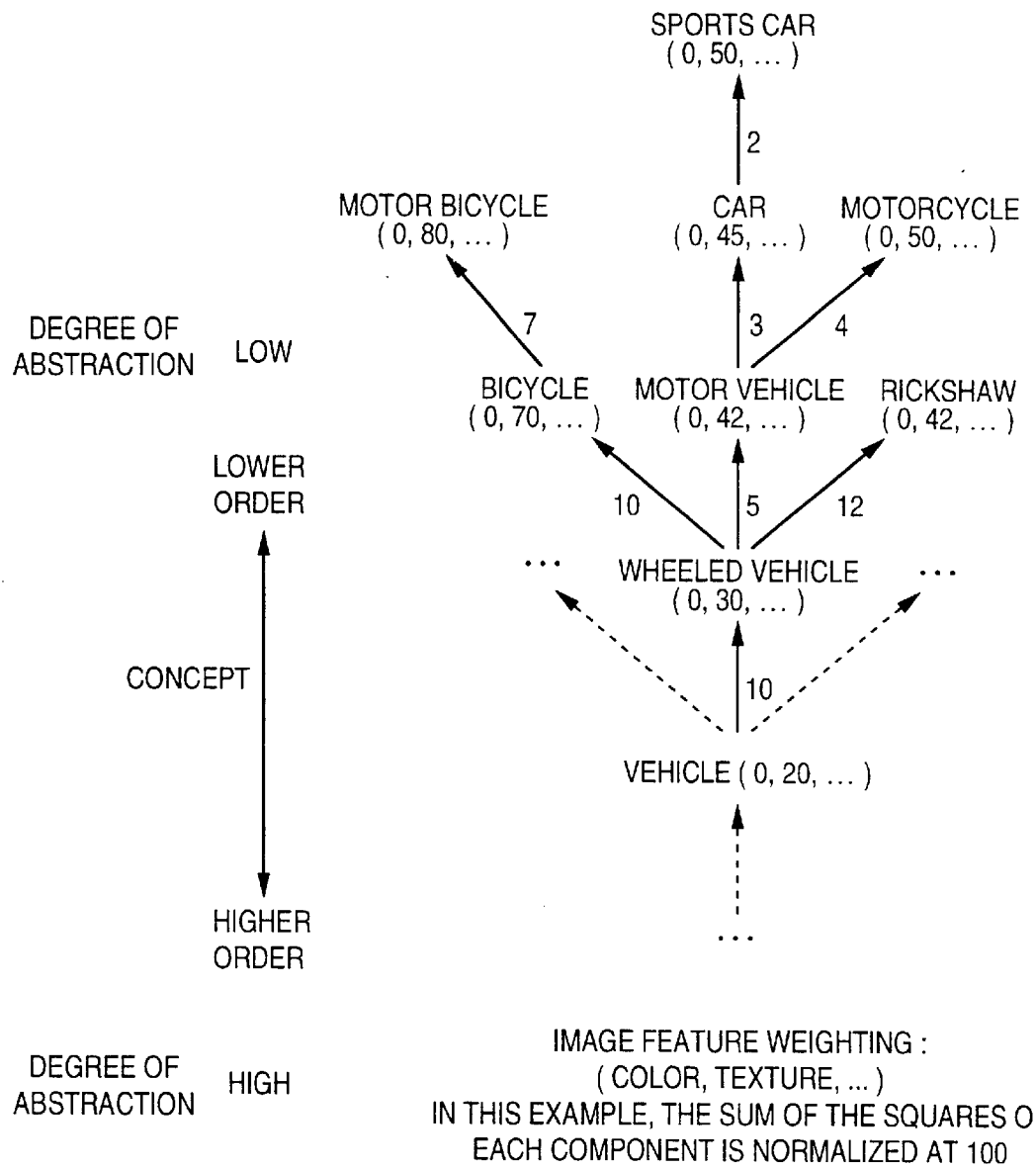
FIG. 2 is a diagram showing an example of the detailed composition of an equivalent/synonym/concept dictionary according to the embodiment of the invention.

FIG. 2 is a diagram showing an example of the detailed construction of the equivalent/synonym/concept dictionary according to the embodiment of the invention.

Equivalents and synonyms are registered in the equivalent/synonym/concept dictionary 8 in dependence upon degrees of abstraction of corresponding to the equivalents and synonyms. Equivalents and synonyms have different degrees of abstraction in terms of the concepts they represent. A concept distance which indicates the difference between degrees of abstraction is defined between these equivalents and synonyms. For example, the concept distance between "vehicle" and "wheeled vehicle" is 10 in FIG. 2.

Further, for equivalents and synonyms, n-dimensional vectors are defined as image feature weightings for subjecting n image features of an entered retrieval word to weighting that reflects the effectiveness of its own image feature in regard to a retrieval word. The n-dimensional vectors are normalized so that the magnitudes thereof are made 100.

For example, a motor vehicle is an artificial object and can be of various colors. Accordingly, the weighting applied to an image feature relating to color is defined as being 0. This means that this image feature should not be referred to in the retrieval operation. As a result, the system executes retrieval in which weight is placed upon image features other than color, these image features being efficacious in regard to the retrieval word. However, if the retrieval word is "red car", then information relating to the color "red" is taken into account and the system performs retrieval in which the color red is taken into consideration as an image feature.

Image registration processing executed by the image processing apparatus of this embodiment to register image data will be described with reference to FIG. 3.

Figure 3:
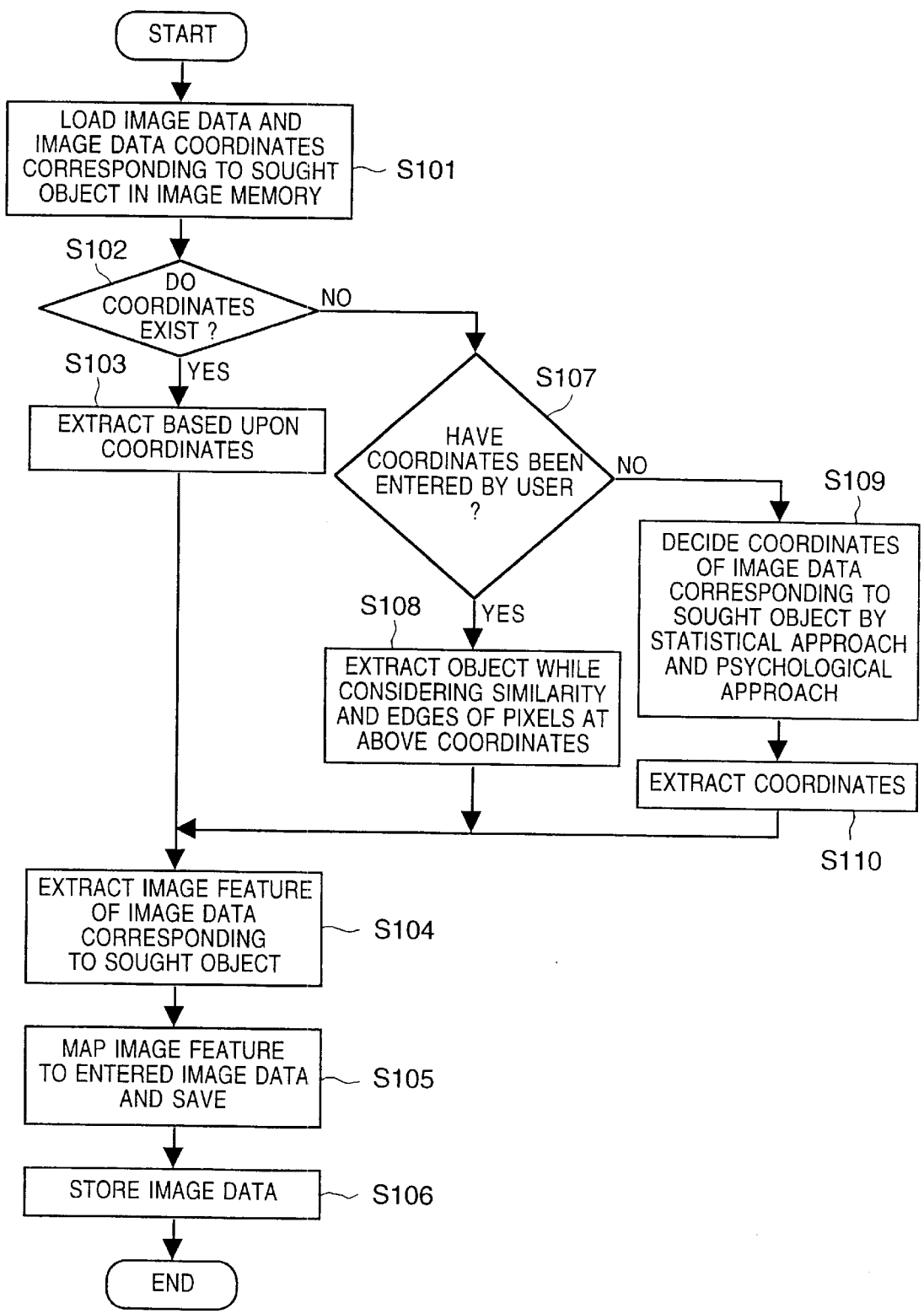
FIG. 3 is a flowchart illustrating the flow of image registration processing executed according to the embodiment of the invention.

FIG. 3 is a flowchart illustrating the flow of image registration processing executed according to the embodiment of the invention.

First, at step S101 in FIG. 3, entered image data and coordinates of sought image data are input by the image input unit 2. The input image data is stored temporarily in the image memory 5. It is determined at step S102 whether the coordinates of the sought image data have been entered or not. If the coordinates of the sought image data have been entered ("YES" at step S102), then control proceeds to step S103, at which the sought image data is extracted from the entered image data using these coordinates.

If the coordinates of the sought image data have not been entered ("NO" at step S102), then control proceeds to step S107, at which it is determined whether coordinates have been entered by the user. If coordinates have been entered by the user ("YES" at step S107), then control proceeds to step S108, at which the sought image data is extracted from the entered image data using these coordinates.

If coordinates have not been entered by the user ("NO" at step S107), then control proceeds to step S109, at which the coordinates of the sought image data are decided from statistical and psychological standpoints. This is followed by step S110, at which the sought image data is extracted from the entered image data using the coordinates that have been decided.

An image feature of the sought image data that has been extracted is extracted at step S104. Next, at step S105, the image feature of the sought image data is registered in the image feature index 9 by being mapped to the entered image data. The entered image data is stored in the image storage unit 4 at step S106.

An overview of retrieval processing executed by the image processing apparatus of this embodiment to retrieve image data will now be described with reference to FIG. 4.

Figure 4:
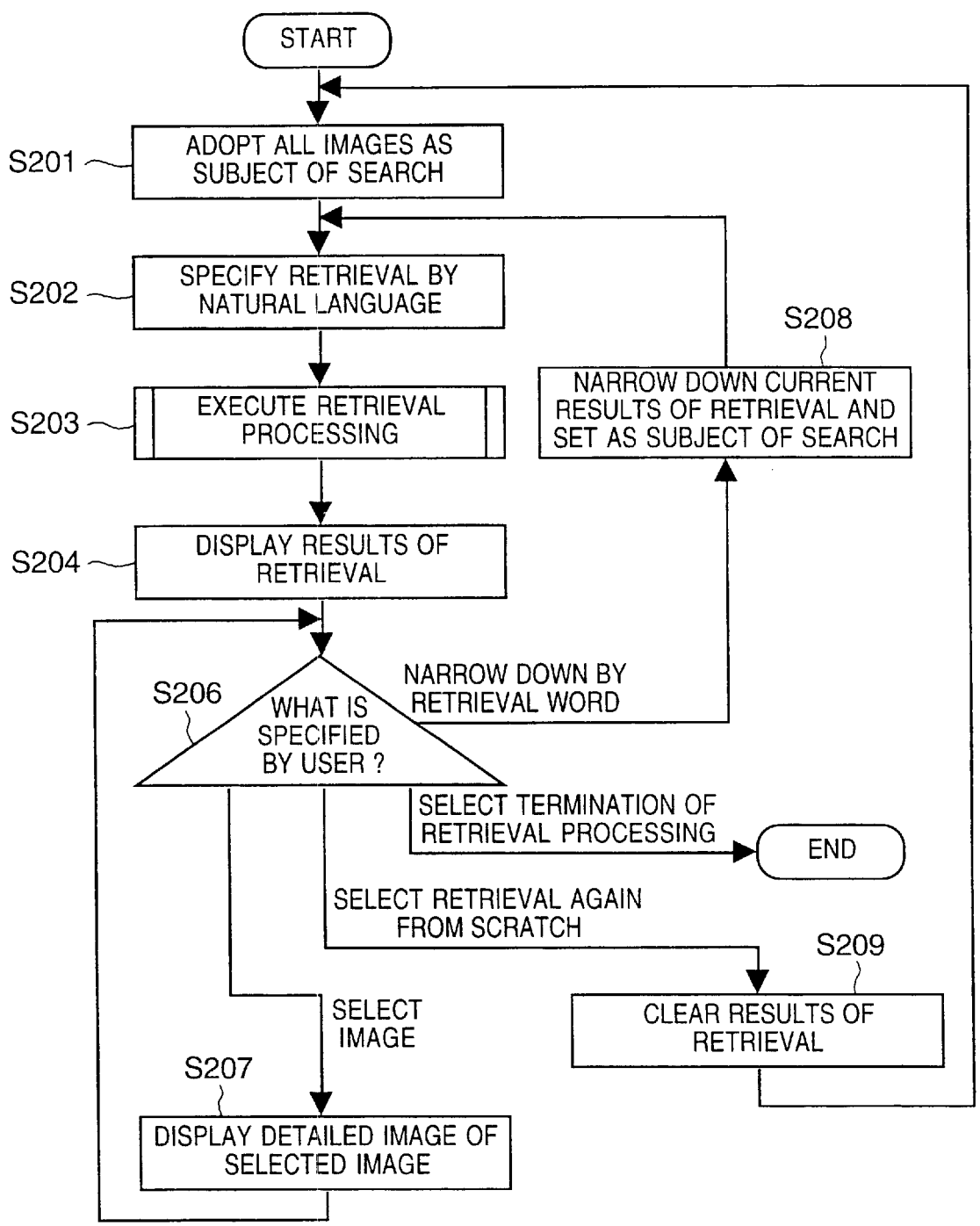
FIG. 4 is a flowchart illustrating an overview of retrieval processing executed according to the embodiment of the invention.

FIG. 4 is a flowchart illustrating an overview of retrieval processing executed according to the embodiment of the invention.

All image information stored in the image storage unit 4 is set at step S201 as image data to be retrieved. This is followed by step S202, at which "natural language" is input from the user interface 1 as a retrieval condition, and by step S203, at which retrieval processing for retrieving image data is executed based upon the entered "natural language". When retrieval processing is executed, the results of retrieval are displayed by the retrieved result notification nit 12 at step S204. This is followed by step S206, at which the apparatus accepts a command entered by the user in regard to the results of retrieval.

If upon viewing the results of retrieval the user decides upon a further search word to narrow down the results of retrieval, an indication to the effect that retrieval is to be performed while narrowing down the current results of retrieval is made from the user interface 1 at step 208, whereupon control returns to step S202 and the user enters a new retrieval condition. In this case the apparatus retains the currently obtained retrieval results and narrows down the results by taking the logical product between the results of retrieval obtained by retrieval processing based upon the newly entered retrieval condition and the results of retrieval that have been retained.

If the user enters a command indicating that retrieval processing should be terminated, then processing is terminated.

If the user enters a command indicating the retrieval should be performed again, then the results of retrieval are cleared at step S209 and control returns to step S201.

If the user enters a command indicating that image data is to be selected in order to display the details of desired image data taken from the image data being displayed (in reduced size) as the results of retrieval, then the details (the image data in the original size) of the selected image data (being displayed in reduced size) are displayed at step S207.

The details of the retrieval processing of step S203 will be described with reference to FIG. 5, which is a flowchart illustrating an overview of retrieval processing executed according to the embodiment of the invention.

First, at step S301, the "natural language" serving as the entered retrieval condition is subjected to morpheme analysis and modifier analysis by referring to the equivalent/synonym/concept dictionary 8, whereby there are extracted a retrieval object name and an external-appearance feature which indicates the feature of the "retrieval object name". Next, it is determined at step S302 whether the extracted "retrieval object name" exists in the equivalent/synonym/concept dictionary 8. If the "retrieval object name" exists in the equivalent/synonym/concept dictionary 8 ("YES" at step S302), then control proceeds to step S303. On the other hand, if the "retrieval object name" does not exist in the equivalent/synonym/concept dictionary 8 ("NO" at step S302), then control proceeds to step S309. The user is prompted at step S309 to acquire the "object name" of a concept that most closely approximates the "retrieval object name". Further, the "object name" acquired is set as the "retrieval object name". The processing of step S309 makes it possible to extract the word of a concept nearest to the entered "retrieval object name". This is followed by step S310, at which the "retrieval object name" set at step S309 is registered as a new "retrieval object name" in the equivalent/synonym/concept dictionary 8.

A specific example of the processing of step S309 will be described with reference to FIGS. 6 through 8.

Figure 6:
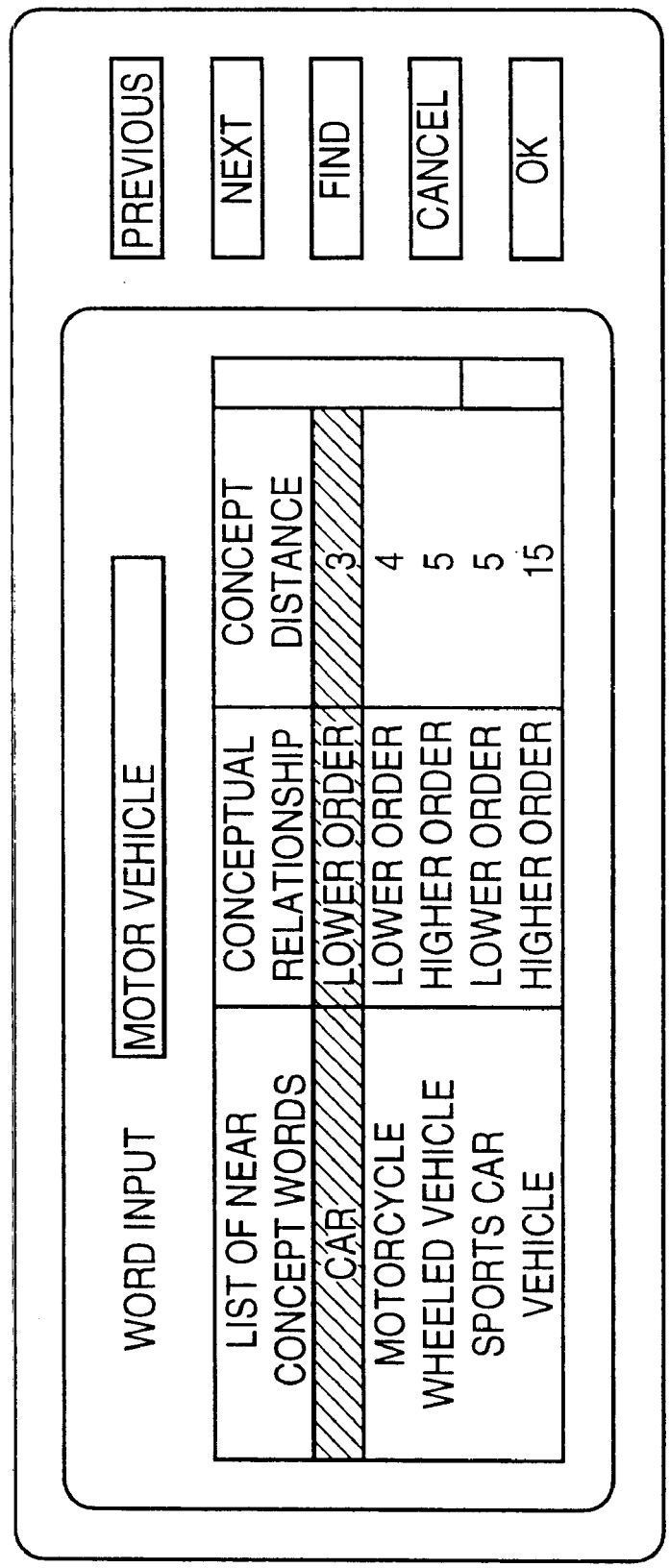
FIG. 6 is a diagram showing an example of a user interface according to the embodiment of the invention.
Figure 7:
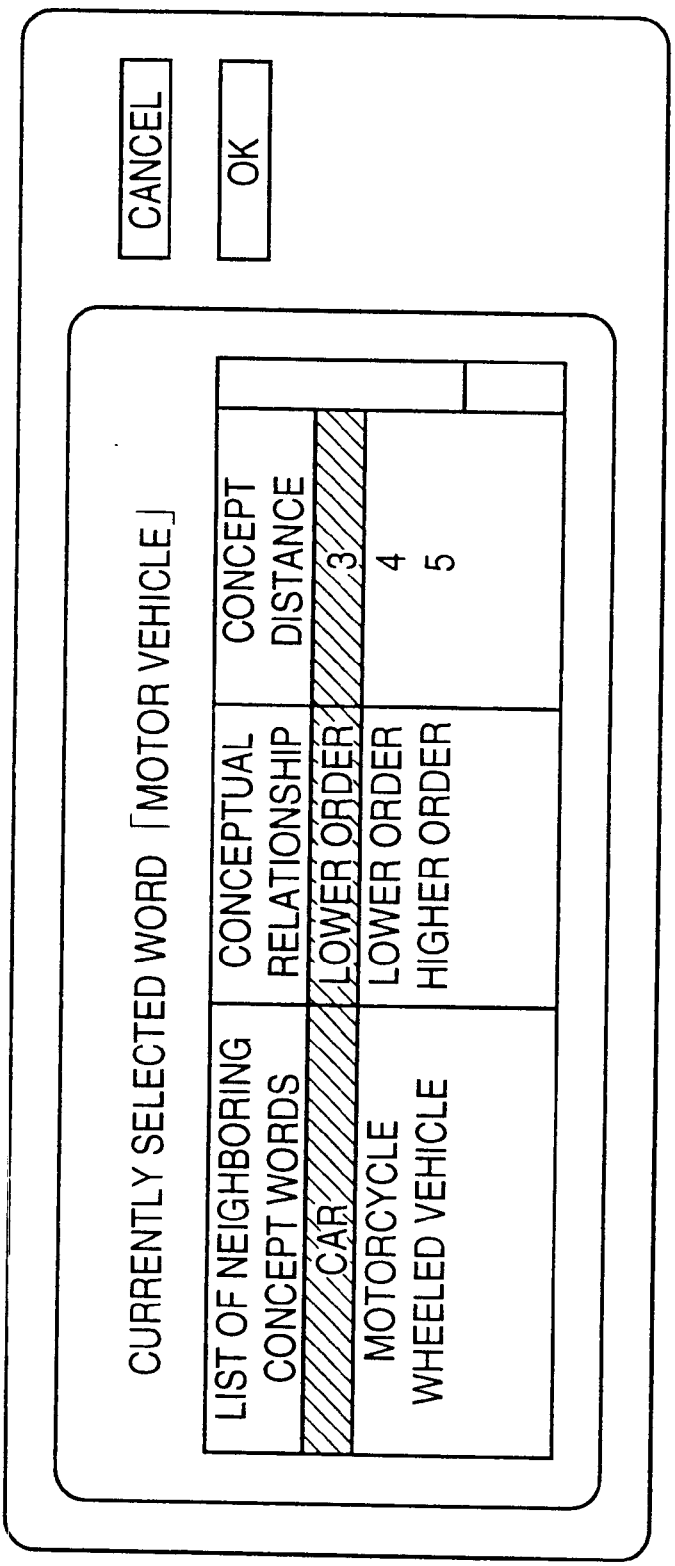
FIG. 7 is a diagram showing an example of a user interface according to the embodiment of the invention.

FIG. 6 is a diagram showing an example of a user interface according to the embodiment of the invention.

When the processing of step S309 is executed, a word entry screen of the kind shown in FIG. 6 is displayed on the retrieved result notification unit 12. If the user enters words of a concept closest to the "retrieval object name" using this word entry screen, the words of a concept closest to these entered words will be displayed. In the example of FIG. 6, "passenger car" was entered as the "retrieval object name". However, since this has not been registered in the equivalent/synonym/concept dictionary 8, FIG. 6 illustrates a case where the concept "motor vehicle" that most closely approximates "passenger car" has been entered.

Five buttons, namely "PREVIOUS", "NEXT", "FIND", "CANCEL" and "OK" are provided on the right side of the word entry screen. When these buttons are clicked using a cursor displayed on the retrieved result notification unit 12, the processing described below is executed.

The "PREVIOUS" button causes the currently displayed word entry screen to return to the preceding word entry screen. The "NEXT" button causes a new word entry screen to be displayed. The "FIND" button retrieves the word of a concept nearest to the entered word and causes the results to be displayed as shown in FIG. 7, by way of example. The "CANCEL" button cancels the entered work. The "OK" button selects the word of a concept nearest to the "retrieval object name" that has not been registered in the equivalent/synonym/concept dictionary 8. On the basis of the selected word, the "retrieval object name" that has not been registered in the equivalent/synonym/concept dictionary 8 is registered at the level of a concept between level of the concept of the selected word and the level of the concept of the neighboring word in the equivalent/synonym/concept dictionary 8.

Figure 8:
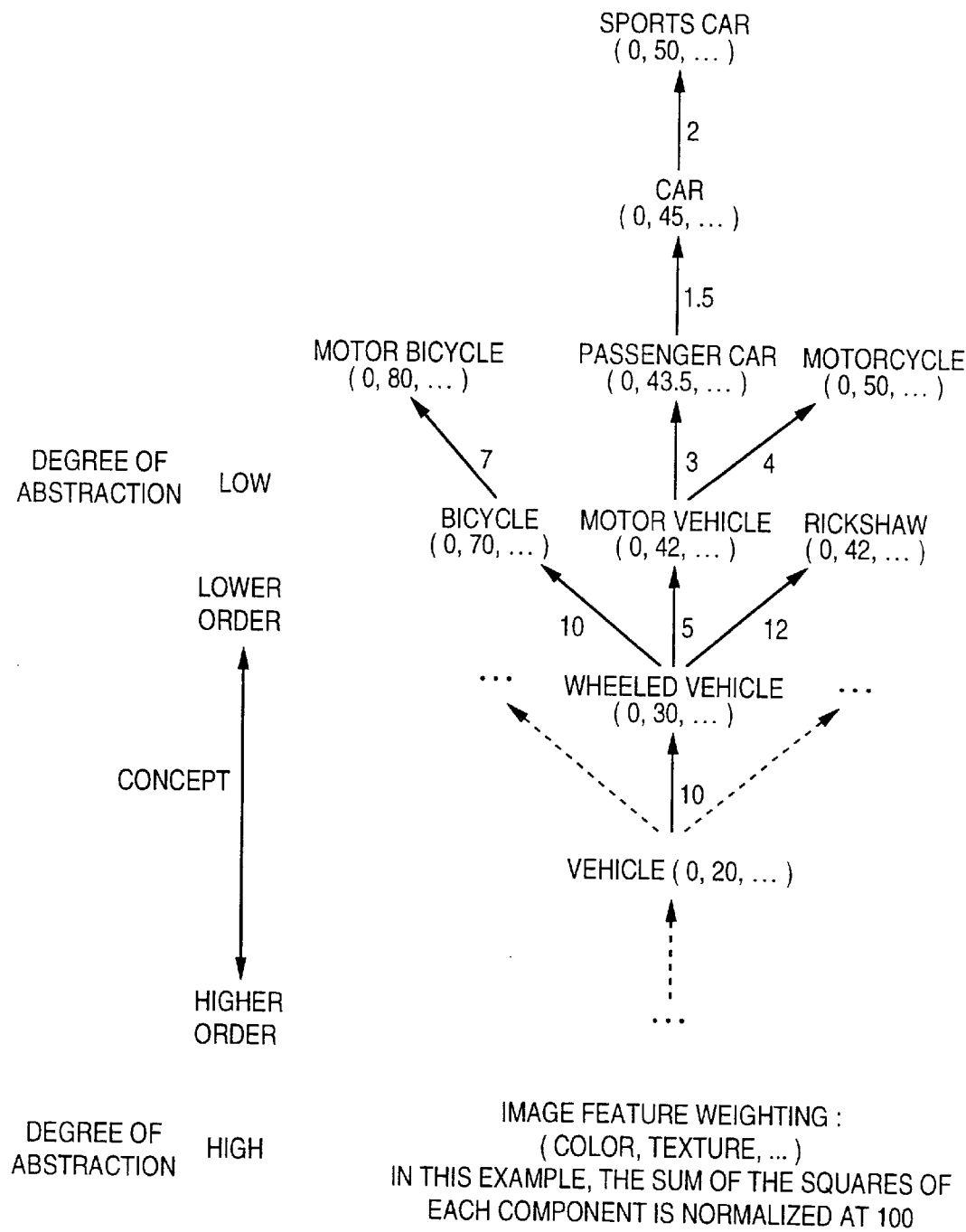
FIG. 8 is a diagram showing an example of updating of an equivalent/synonym/concept dictionary according to the embodiment of the invention.

For example, if "motor vehicle" is selected as the words of a concept most closely approximating "passenger car", which has not been registered in the equivalent/synonym/concept dictionary 8, then "passenger car" is registered as the words having the level of a concept between the level of the concept of "motor vehicle" and the level of the concept of "car", as shown in FIG. 8. Further, the position at which "passenger car" is registered is such that the concept distance to "motor vehicle" is the same as the concept distance to "car". Furthermore, the image feature weighting of "passenger car" is created and registered based upon the image feature weighting of "motor vehicle" and the image feature weighting of "car".

Figure 5:
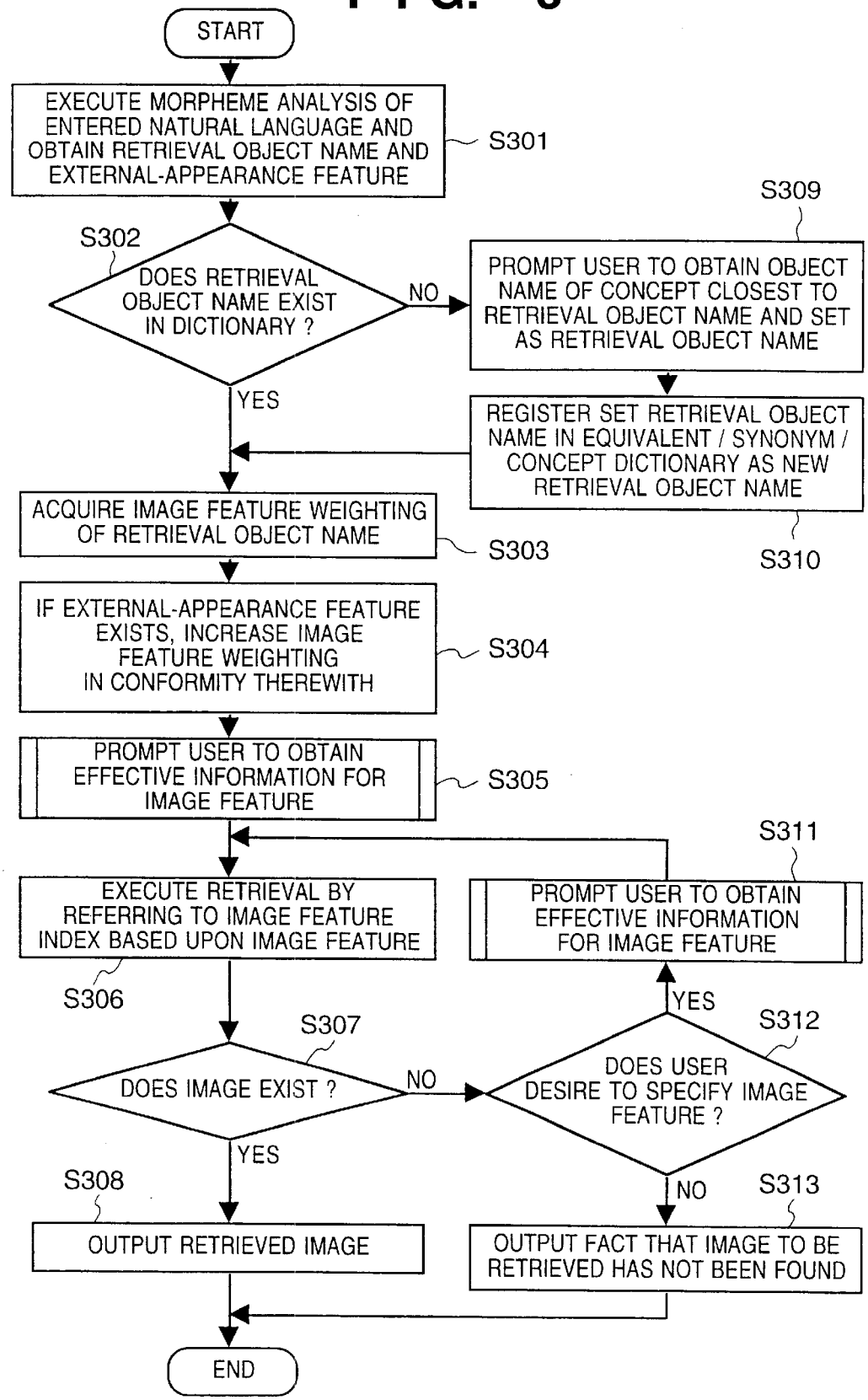
FIG. 5 is a flowchart illustrating the details of retrieval processing executed according to the embodiment of the present invention.

With reference again to the flowchart of FIG. 5, the image feature weighting of "retrieval object name" is acquired from the equivalent/synonym/concept dictionary 8 at step S303. This is followed by step S304 where, if the external-appearance feature of the "retrieval object name" has been extracted, the image feature weighting relating to this external-appearance feature is appended to the image feature weighting acquired at step S303. The user is prompted at step S305 to obtain an effective image feature weighting for the image feature. The details of this processing will be described with reference to the flowchart of FIG. 9.

Figure 9:
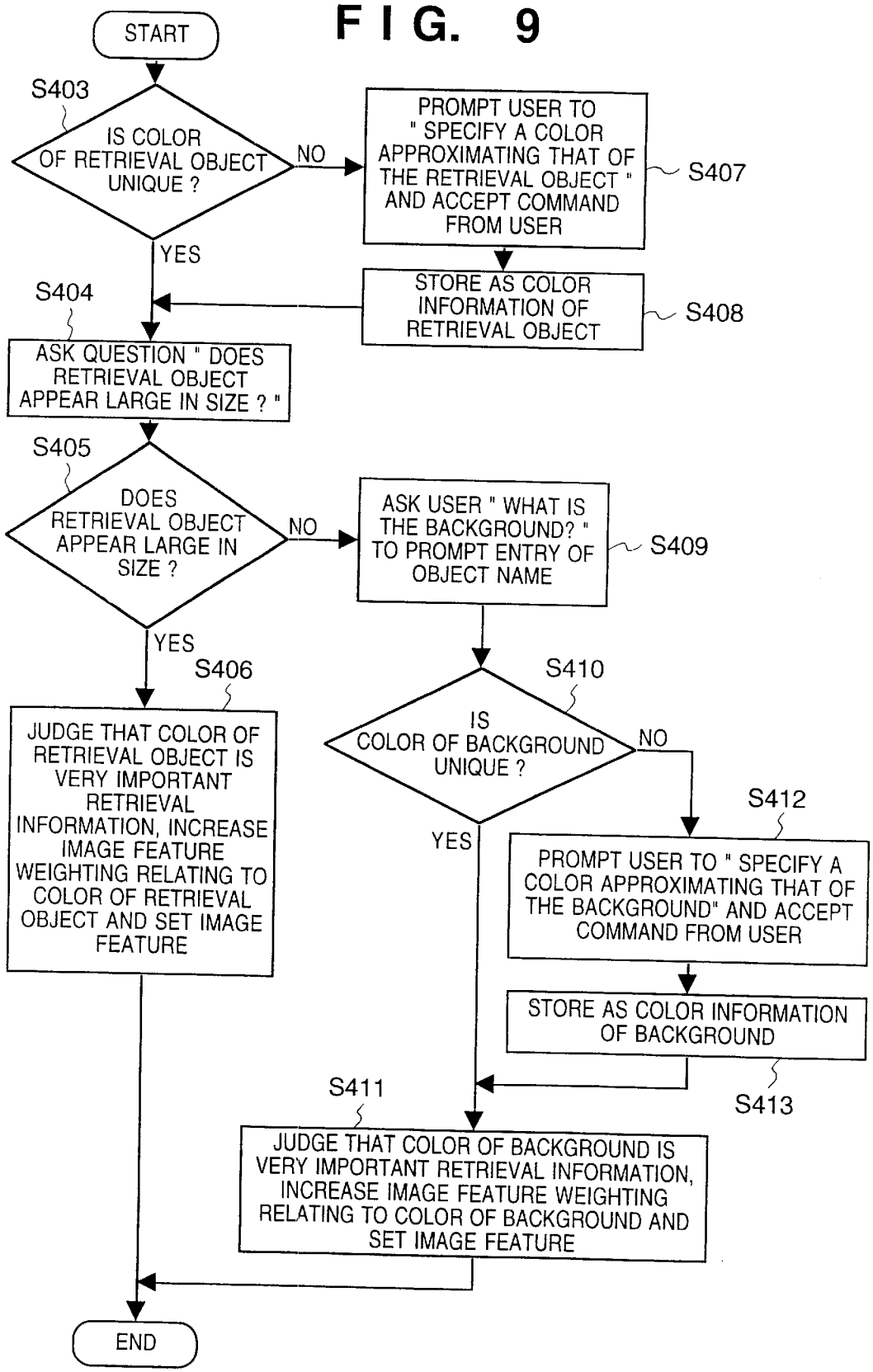
FIG. 9 is a flowchart illustrating the details of processing of a step S305 according to this embodiment.

FIG. 9 is a flowchart illustrating the details of processing of step S305 according to this embodiment.

It should be noted that the processing of FIG. 9 is executed to make up for a case where further information (image feature weighting) useful in retrieval is desired to be obtained or for a case where image features in retrieval are too few.

Figure 10:
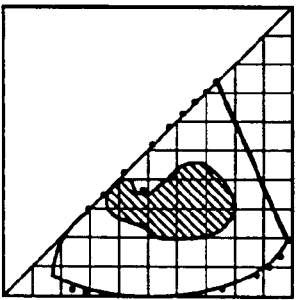
FIG. 10 is a diagram showing an example of a user interface according to the embodiment of the invention.

First, at step S403, it is determined, based upon the image feature weighting of an acquired "retrieval object name", whether the color of the retrieval object indicated by the "retrieval object name" is unique. If the color of the retrieval object is unique ("YES" at step S403), then control proceeds to step S404. If the color of the retrieval object is not unique ("NO" at step S403), on the other hand, then control proceeds to step S407. The user is prompted to "SPECIFY A COLOR APPROXIMATING THAT OF THE RETRIEVAL OBJECT" at step S407 using a dialog screen of the kind shown in FIG. 10, and the apparatus accepts the designation made by the user. The color is specified using language or a color sample in the manner depicted in FIG. 10. Noted, a colorimetric system of the color sample is not limited, CIE 1976, L*a*b*,YCbCr, and the like may be used. The color that has been specified is stored as image feature weighting at step S408.

Figure 11:
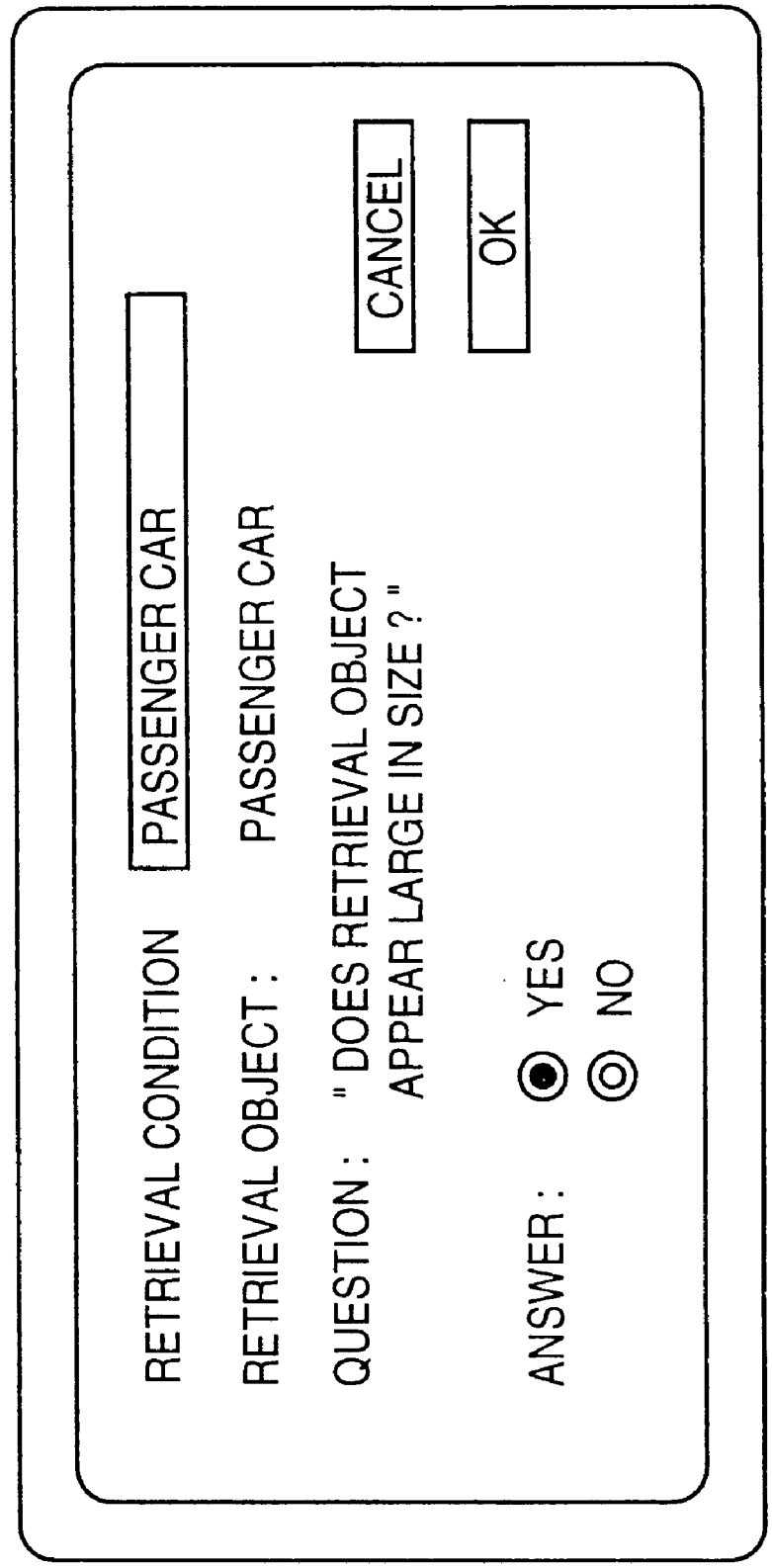
FIG. 11 is a diagram showing an example of a user interface according to the embodiment of the invention.

The user is questioned "DOES RETRIEVAL OBJECT APPEAR LARGE IN SIZE?" at step S404 using a dialog screen of the kind shown in FIG. 11. This is followed by step S405, at which the user employs this dialog screen to make an answer is regard to the size of the retrieval object indicated by the "retrieval object name". If the retrieval object appears large in size ("YES" at step S405), then control proceeds to step S406. Here it is judged that the color of the retrieval object indicated by the "retrieval object name" is an extremely important item of retrieval information and the image feature weighting relating to the color of the retrieval object is increased to set the image feature of the "retrieval object name". If the retrieval object does not appear large in size ("NO" at step S405), then control proceeds to step S409.

Figure 12:
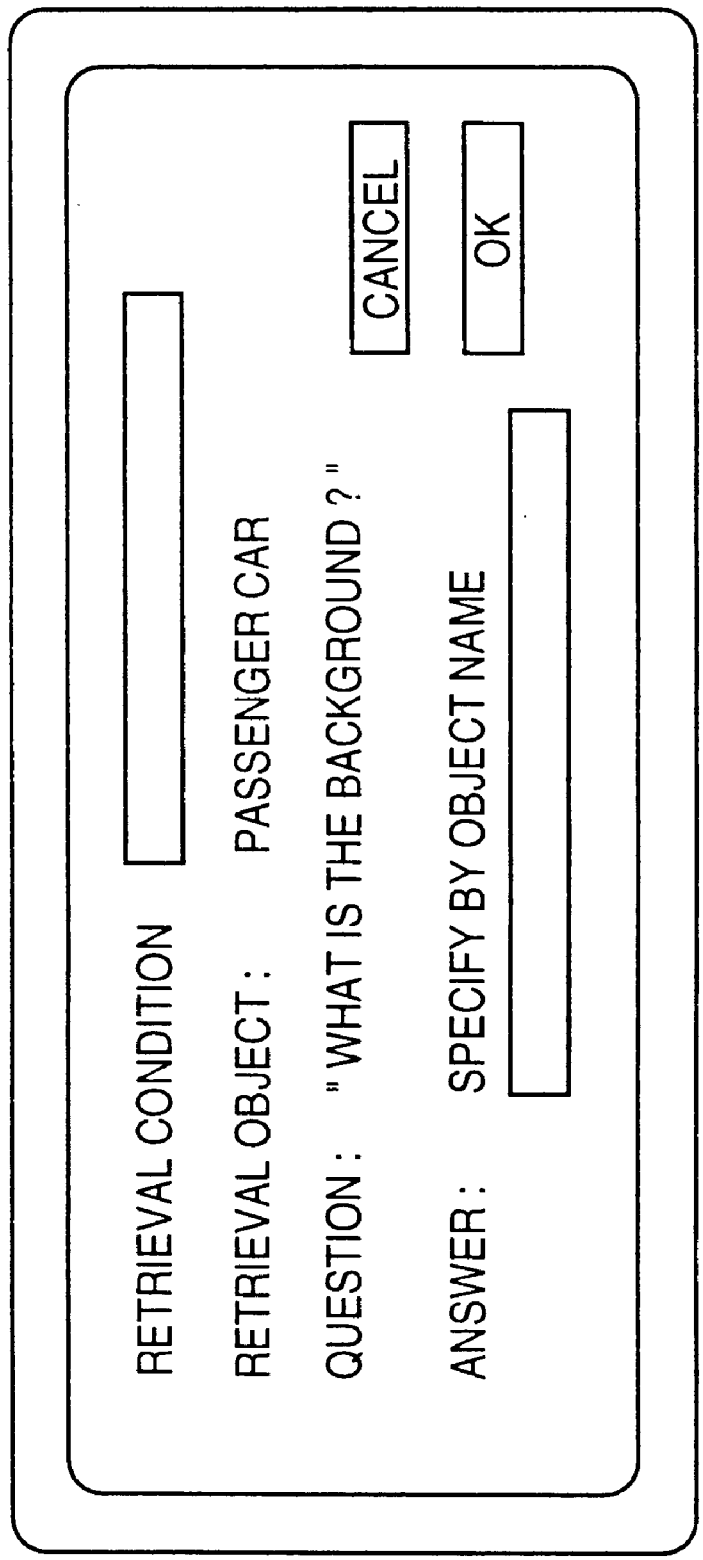
FIG. 12 is a diagram showing an example of a user interface according to the embodiment of the invention.
Figure 13:
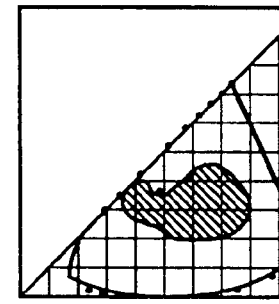
FIG. 13 is a diagram showing an example of a user interface according to the embodiment of the invention.

The user is questioned "WHAT IS THE BACKGROUND?" at step S409 using a dialog screen of the kind shown in FIG. 12. In addition, a command from the user is accepted. The background is specified by an object name in the manner shown in FIG. 12. It is determined at step S410 whether the color of the background object is unique. If the color of the background object is unique ("YES" at step S410), then control proceeds to step S411. If the color of the background object is not unique ("NO" at step S410), then control proceeds to step S412. The user is prompted to "SPECIFY A COLOR APPROXIMATING THAT OF THE BACKGROUND" at step S413 using a dialog screen of the kind shown in FIG. 13, and the apparatus accepts the designation made by the user. The specified color is stored as image feature weighting at step S413.

It is judged at step S411 that the color of the background is an extremely important item of retrieval information and the image feature weighting relating to the color of the background is increased to set the image feature of the "retrieval object name".

Here a case has been described in which information relating to color of retrieval object and color of background is specified by the operator. However, it goes without saying that an arrangement can be adopted in which information relating to the features of the surface of a retrieval object and information relating to other features may be specified by the user. In the arrangement set forth above, image feature weighting useful in retrieval based upon entered retrieval conditions can be created and retrieval can be performed based upon an image feature that takes this image feature weighting into account. This makes it possible to perform more precise retrieval.

With reference again to the flowchart of FIG. 5, image data is retrieved at step S306 by referring to the image feature index 9 based upon the image feature. Next, it is determined a step S307 whether image data to be retrieved exists. If image data to be retrieved exists ("YES" at step S307), then control proceeds to step S308. Here the image data that has been retrieved is displayed on the retrieved result notification unit 12. If image data to be retrieved does not exist ("NO" at step S307), then control proceeds to step S312.

It is determined at step S312 whether the user wishes to re-specify an image feature. If the user desires to re-specify ("YES" at step S312), then control proceeds to step S311. Here the user is prompted to acquire an effective image feature weighting for the image feature. The details of this processing are as described above in the flowchart of FIG. 9. If the user does not desire to re-specify ("NO" at step S312), then control proceeds to step S313. Here the fact that no image data has been retrieved is displayed on the retrieved result notification unit 12.

In accordance with this embodiment as described above, entered image data is managed by being mapped to the image feature of sought image data contained in this image data. As a result, the conventional operation of appending explanatory text and keywords to image data is no longer required and it is possible to retrieve desired image data from managed image data in an efficient manner.

Further, it is possible to enter, in dependence upon an entered retrieval condition, an external-appearance feature of a retrieval object that constitutes the retrieval condition, and detailed retrieval conditions desired by the user can be entered. Even if natural language that has not been registered in the equivalent/synonym/concept dictionary 8 is entered, a word of the concept that approximates this natural language can be entered and retrieved. The user need not append a keyword but need only enter a retrieval word to make possible the retrieval of image data desired by the user. In the event of an unknown word such as a word newly coined, the equivalent/synonym/concept dictionary 8 can be updated by a learning function through an interactive interface with the user. This makes it possible to realize an automatic learning function for retrieval in line with user preference and allows broader searches in conformity with changing times.

In the embodiment set forth above, an example is described in which natural image data is retrieved. However, the gist of the present invention is a technique that can be applied to the retrieval of all forms of information media.

Further, though not set forth in this embodiment, it is possible to execute processing in parallel with processing for appending explanatory text and keywords to images and performing retrieval based upon the same, combine the results of this processing and give notification of the results of retrieval.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, the present invention covers a case where an operating system or the like working on the computer performs a part of or the entire process in accordance with the designation of program codes and implements the functions according to the embodiment.

The present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Figure 14:
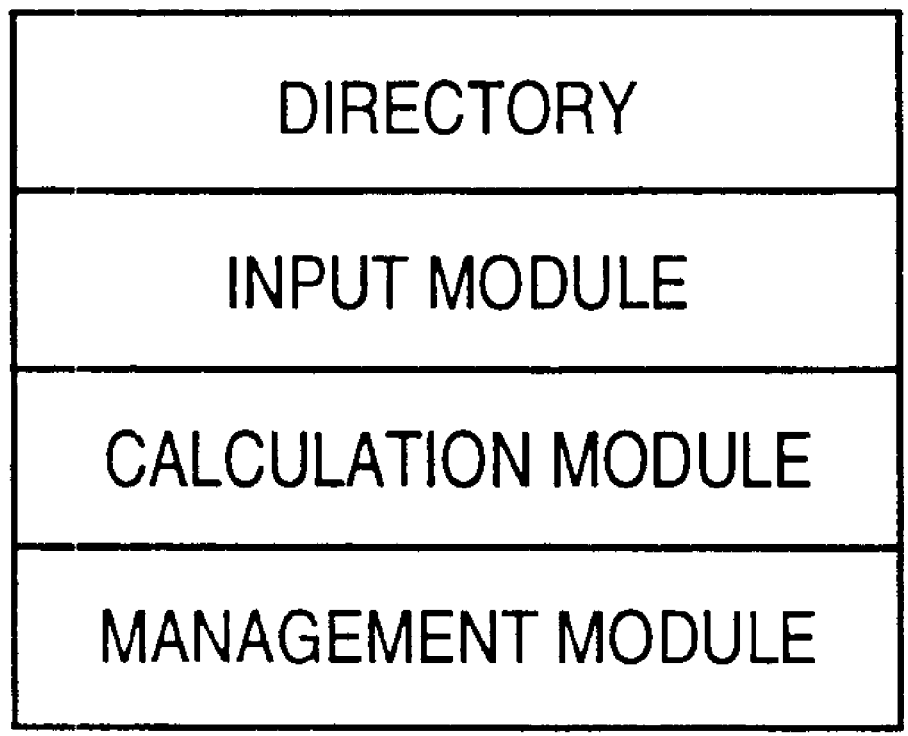
FIG. 14 is a diagram showing the structure of the memory map of a storage medium storing program code for implementing the embodiment of the present invention.

In a case where the present invention is applied to the above-mentioned storage medium, program code corresponding to the above-described flowcharts is stored on the storage medium. That is, the modules shown in the example of the memory map of FIG. 14 would be stored on the storage medium.

Specifically, the program code stored on the storage medium would be that for at least an "input module", "calculation module" and "management module".

The "input module" is for entering image data as well as the coordinate of sought image data contained in the image data. The "calculation module" is for calculating an image feature of the sought image data based upon the entered coordinates of the sought image data. The "management module" is for mapping and managing calculated image features and entered image data.

The present invention is not limited to the above embodiments and various changes and modifications can be made within the spirit and scope of the present invention.

Therefore, to apprise the public of the scope of the present invention, the following claims are made.

What is claimed is:

1. An image processing apparatus for managing image data, comprising:

input means for inputting coordinates of target image data contained in an input image data;

target image data extraction means for extracting the target image data based upon the coordinates of the target image data input by said input means;

calculating means for calculating an image feature of the target image data based upon the coordinates of the target image data input by said input means; and management means for performing management in a memory by mapping the image feature calculated by said calculating means in relation to the input image data in order to retrieve the input image data.

2. The apparatus according to claim 1, wherein said input means includes:

photography means for capturing an image by photography;

sensing means for sensing line of sight of a user with respect to the image captured by said photography means; and extracting means for extracting coordinates of the target image data based upon results of sensing performed by said sensing means.

3. The apparatus according to claim 1, wherein said input means includes:

photography means for capturing an image by photography;

display means for displaying the image captured by said photography means;

designating means for designating a target image contained in the image displayed by said display means; and extracting means for extracting coordinates of the target image data, which is based upon the target image, based upon results of designation by said designating means.

4. The apparatus according to claim 1, wherein said input means includes:

photography means for capturing an image by photography;

deciding means for deciding coordinates of the target image data, which is based upon a target image contained in the image, based upon a photographic characteristic of said photography means.

5. The apparatus according to claim 1, further comprising retrieval-condition input means for inputting a retrieval condition for retrieving desired image data from the image data managed by said management means.

6. The apparatus according to claim 5, further comprising:

analyzing means for analyzing the retrieval conditions entered from said retrieval-condition input means; and output means which, on the basis of results of analysis by said analyzing means, outputs a prompt which prompts the user to enter a retrieval condition that is different from the above-mentioned retrieval condition.

7. A method of controlling an image processing apparatus for managing image data, comprising:

an input step of inputting coordinates of target image data contained in an input image data;

a target image data extraction step of extracting the target image data based upon the coordinates of the target image data input by said input step;

a calculating step of calculating an image feature of the target image data based upon the coordinates of the target image data input at the input step; and a management step of performing management in a memory by mapping the image feature calculated at said calculating step in relation to the input image data in order to retrieve the input image data.

8. The method according to claim 7, wherein said input step includes:

a sensing step of sensing line of sight of a user with respect to a captured image; and an extracting step of extracting coordinates of the target image data based upon results of sensing performed at said sensing step.

9. The method according to claim 7, wherein said input step includes:

a display step of displaying a captured image; and an extracting step of extracting coordinates of the target image data, which is based upon a designated target image contained in the image displayed at said display step.

10. The method according to claim 7, wherein said input step includes a deciding step of deciding coordinates of the target image data, which is based upon a target image contained in the image, based upon a photographic characteristic of a captured image.

11. The method according to claim 7, further comprising a retrieval-condition input step of inputting a retrieval condition for retrieving desired image data from the image data in the memory managed at said management step.

12. The method according to claim 11, further comprising:

an analyzing step of analyzing the retrieval conditions entered at said retrieval-condition input step; and an output step which, on the basis of results of analysis at said analyzing step, outputs a prompt which prompts the user to enter a retrieval condition that is different from the above-mentioned retrieval condition.

13. A computer readable memory storing program codes for controlling an image processing apparatus for managing image data, comprising:

program code of an input step of inputting coordinates of target image data contained in an input image data;

program code of a target image data extraction step of extracting the target image data based upon the coordinates of the target image data input by said input step;

program code of a calculating step of calculating an image feature of the target image data based upon the coordinates of the target image data input at said input step; and program code of a management step of performing management in a memory by mapping the image feature calculated at the calculating step in relation to the input image data in order to retrieve the input image data.

* * * * *